United States Patent
Chopp, Jr. et al.

(10) Patent No.: US 7,789,359 B2
(45) Date of Patent: Sep. 7, 2010

(54) AUXILIARY CABLE BRACKET

(75) Inventors: Joseph A Chopp, Jr., New Lenox, IL (US); Lawrence E. Mosley, Jr., Hammond, IN (US)

(73) Assignee: Panduit Corp., Tinley Park, IL (US)

( * ) Notice: Subject to any disclaimer, the term of this patent is extended or adjusted under 35 U.S.C. 154(b) by 367 days.

(21) Appl. No.: 11/739,148

(22) Filed: Apr. 24, 2007

(65) Prior Publication Data
US 2008/0264688 A1   Oct. 30, 2008

(51) Int. Cl.
E06C 7/14   (2006.01)
(52) U.S. Cl. ............... 248/211; 248/210; 248/238; 248/304; 248/216.1; 182/129
(58) Field of Classification Search ............ 248/210, 248/211, 238, 316.8, 304, 295.11, 297.31, 248/71, 74.1, 229.14, 229.16, 229.24, 229.26, 248/216.1; 182/129
See application file for complete search history.

(56) References Cited

U.S. PATENT DOCUMENTS

| | | | | |
|---|---|---|---|---|
| 1,154,847 | A * | 9/1915 | Gidlof | 248/297.31 |
| 1,213,622 | A * | 1/1917 | DeVore | 248/210 |
| 1,444,759 | A * | 2/1923 | Traylor | 182/116 |
| 1,777,884 | A * | 10/1930 | Horix | 248/230.5 |
| 2,241,657 | A * | 5/1941 | Dehring | 248/71 |
| 2,312,393 | A * | 3/1943 | Donnelly | 362/355 |
| 2,760,674 | A * | 8/1956 | Karp | 220/326 |
| 3,389,734 | A | 6/1968 | Gutshall | |
| 3,836,106 | A * | 9/1974 | Gray | 248/229.26 |
| 3,987,993 | A * | 10/1976 | Hopkins | 248/210 |
| 4,025,016 | A * | 5/1977 | Brothers | 248/210 |
| 4,036,463 | A * | 7/1977 | Hopkins et al. | 248/210 |
| 4,220,188 | A | 9/1980 | McMurray | |
| 4,705,441 | A | 11/1987 | Arnold | |
| 4,767,092 | A * | 8/1988 | Weatherly | 248/311.2 |
| 4,812,095 | A | 3/1989 | Piacenti et al. | |
| 5,078,613 | A | 1/1992 | Salmon | |
| 5,199,839 | A | 4/1993 | DeHaitre | |
| 5,207,588 | A | 5/1993 | Ladouceur et al. | |
| 5,228,739 | A * | 7/1993 | Love | 296/100.02 |
| 5,271,585 | A | 12/1993 | Zetena, Jr. | |
| 5,274,888 | A * | 1/1994 | Payne | 24/277 |
| 5,316,244 | A | 5/1994 | Zetena, Jr. | |
| 5,584,453 | A * | 12/1996 | Morter | 248/210 |
| 5,759,004 | A * | 6/1998 | Kuffel | 411/508 |
| 5,785,447 | A * | 7/1998 | Fonti et al. | 403/49 |
| 6,029,827 | A * | 2/2000 | Valiulis | 211/59.1 |
| 6,095,466 | A * | 8/2000 | Sener et al. | 248/231.61 |

(Continued)

OTHER PUBLICATIONS

Panduit Corp. website page showing Part No. FLRB, date unknown, 1 page.

*Primary Examiner*—J. Allen Shriver, II
*Assistant Examiner*—Michael McDuffie
(74) *Attorney, Agent, or Firm*—Robert A. McCann; Christopher S. Clancy

(57) ABSTRACT

An auxiliary cable bracket having a main plate and a mounting plate. The mounting plate is connected to the main plate and is positioned spaced apart from the main plate such that the frame of a ladder rack section can be positioned therebetween. At least one tooth is formed on a surface of at least one of the mounting plate and the main plate.

16 Claims, 7 Drawing Sheets

U.S. PATENT DOCUMENTS

| | | | |
|---|---|---|---|
| 6,298,629 B1 * | 10/2001 | Ador | 52/698 |
| 6,325,350 B1 * | 12/2001 | Mancuso | 248/311.2 |
| 6,378,814 B1 * | 4/2002 | Kaplan | 248/71 |
| 6,618,905 B2 * | 9/2003 | Warashina et al. | 16/426 |
| 7,028,960 B2 * | 4/2006 | Goldstein | 248/263 |
| 7,252,274 B1 * | 8/2007 | Brannen | 248/301 |
| 2003/0209387 A1 * | 11/2003 | Burr | 182/129 |
| 2005/0258315 A1 * | 11/2005 | Bigham | 248/74.3 |
| 2006/0257229 A1 | 11/2006 | Bucciferro et al. | |

* cited by examiner

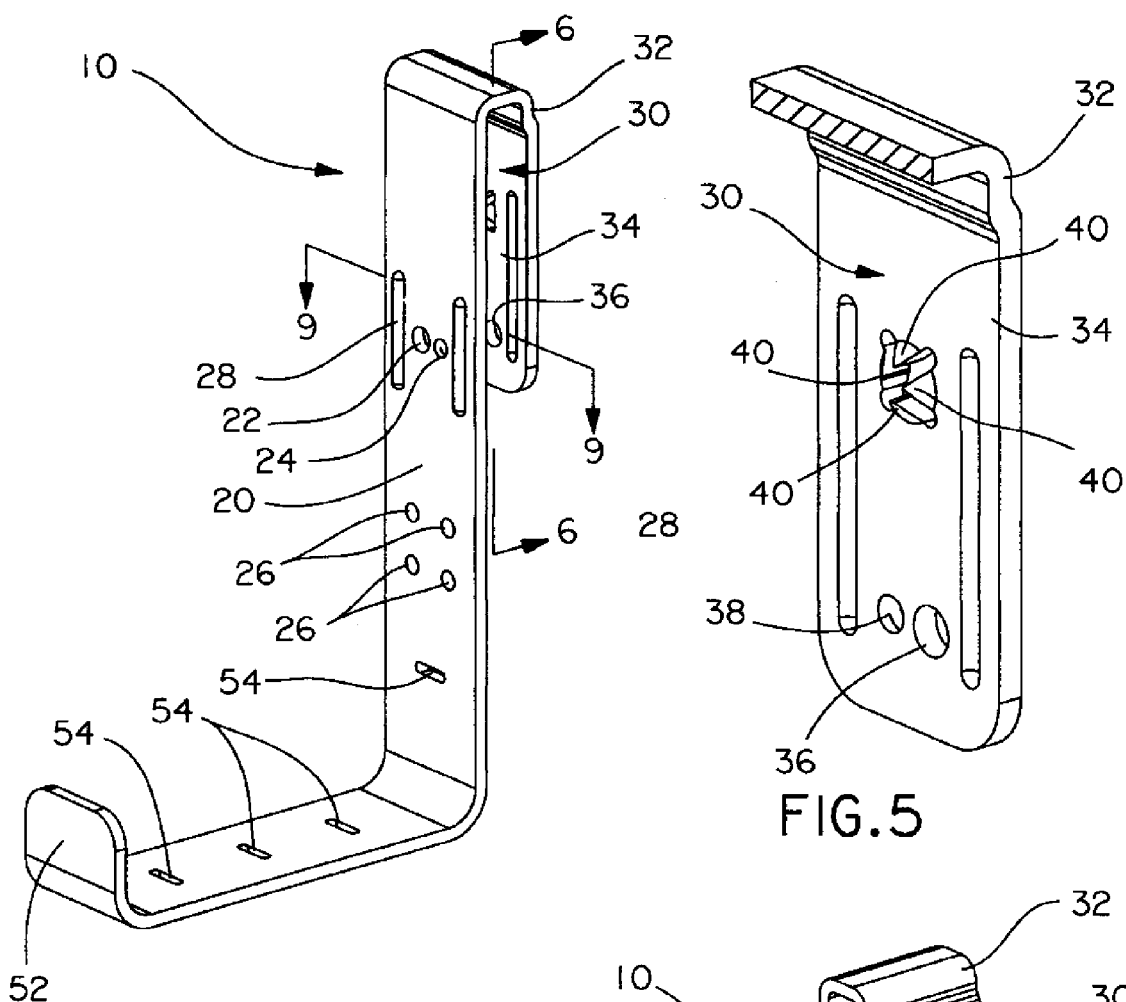
FIG.3
FIG.5
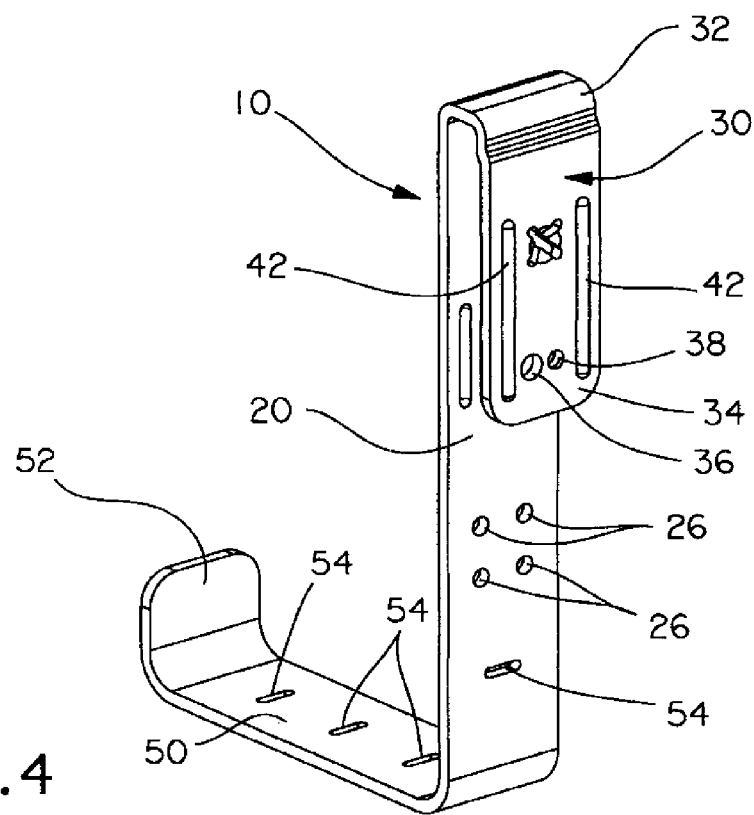
FIG.4

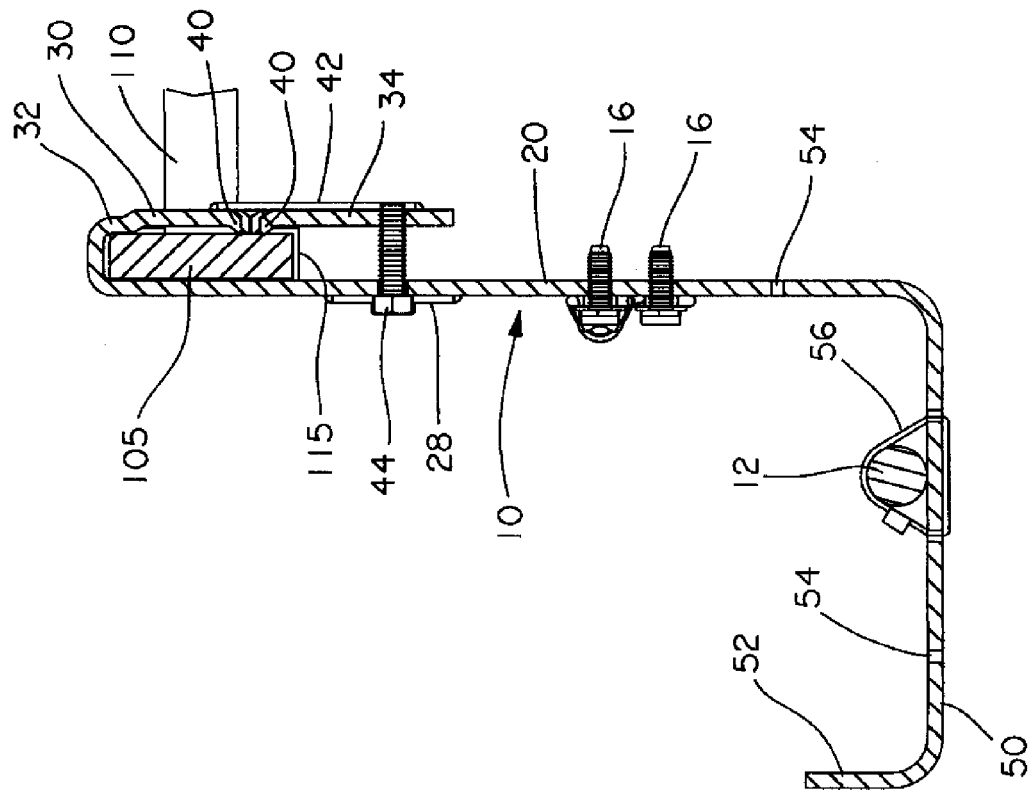
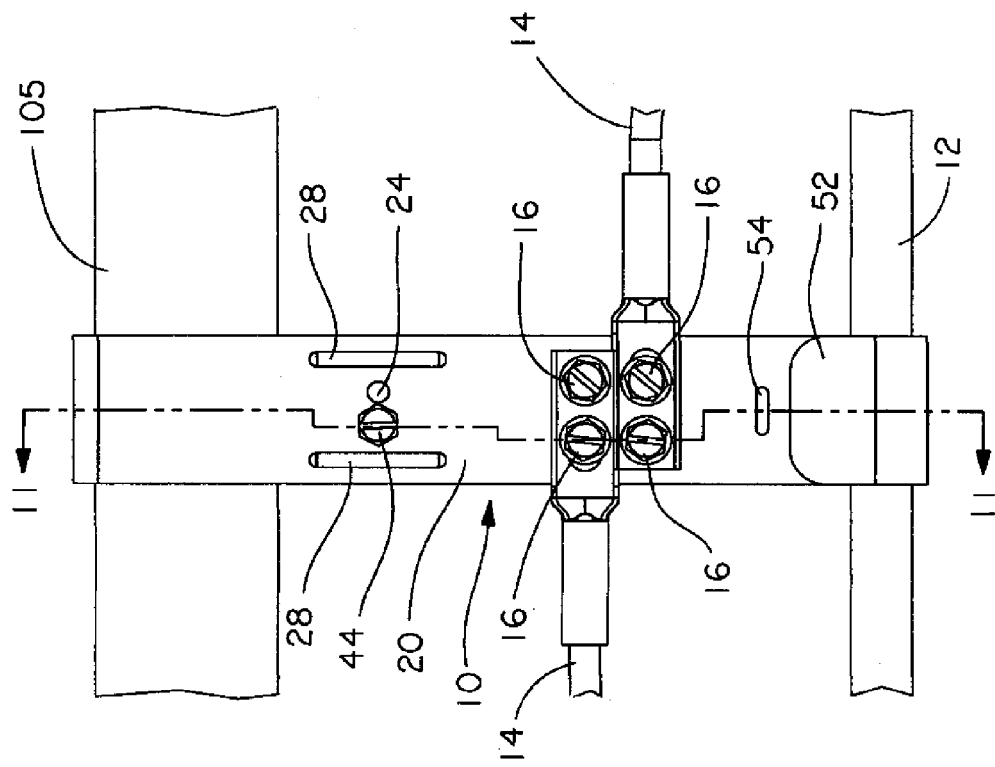

US 7,789,359 B2

AUXILIARY CABLE BRACKET

FIELD OF INVENTION

This invention relates to auxiliary cable brackets and, more particularly, to auxiliary cable brackets for use with ladder racks to support data cables.

BACKGROUND

Data centers and central offices typically use ladder racks to support data cables and other types of cables and wiring above equipment racks, cabinets and other equipment. Ground cables must be run along side the data cables: however, the ground cables cannot be placed in the ladder racks according to Telcordia GR-295 (General Requirements 295-Isolated Ground Planes: Definitions and Applications to Telephone Control Offices). Therefore, auxiliary cable brackets are typically attached to the ladder rack to support the ground cables.

These auxiliary cable brackets are typically "L" shaped brackets with a cable support arm directed outward from the ladder rack or inward, underneath the ladder rack. The auxiliary cable brackets are usually secured to the frame of the ladder rack through a variety of methods such as bolts, nuts, washers screws, etc. However, these auxiliary cable brackets are not designed to easily provide an electrical bond between the ladder rack and the auxiliary cable bracket. These brackets typically require drilling holes in the ladder rack to install grounding screws or require the removal of the coating from the ladder rack with sand paper or a file to expose the base metal of the ladder rack to provide an electrical bond. This creates metal chips and debris that can fall onto or into the equipment in the data center. In addition, these auxiliary cable brackets are usually difficult to install when the support arm is directed underneath the ladder rack as they require the installer to reach underneath the ladder rack to secure the auxiliary cable bracket.

Therefore, there is a need for an auxiliary cable bracket that provides an electrical bond with the ladder rack when installed and for an auxiliary cable bracket that can be easily installed with the support arm facing away from the ladder rack or underneath the ladder rack.

SUMMARY OF THE INVENTION

In one example, an auxiliary cable bracket has a main plate and a mounting plate. The mounting plate is connected to the main plate and is positioned spaced apart from the main plate such that the frame of a ladder rack section can be positioned therebetween. At least one tooth is formed on a surface of at least one of the mounting plate and the main plate.

In another example, an auxiliary cable bracket has a main plate and a mounting plate connected to the main plate. The mounting plate is positioned spaced apart from the main plate such that a frame of a ladder rack section can be positioned therebetween. The main plate has a first aperture and a first threaded aperture and the mounting plate has a second aperture generally aligned with the first threaded aperture in the main plate and a second threaded aperture generally aligned with the first aperture in the main plate.

In another example, a method for installing an auxiliary cable bracket has the steps of: positioning the auxiliary cable bracket onto a frame member of a ladder rack section such that a main plate and a mounting plate of the auxiliary cable bracket are positioned on opposite sides of the frame member and a tooth formed on a surface of at least one of the mounting plate and the main plate is positioned adjacent the frame member; and applying a force to the plate having the tooth formed thereon such that the tooth engages the frame to form an electrical bond between the frame and the auxiliary cable bracket.

BRIEF DESCRIPTION OF THE DRAWINGS

Certain embodiments of the present invention are illustrated by the accompanying figures. It should be understood that the figures are not necessarily to scale and that details that are not necessary for an understanding of the invention or that render other details difficult to perceive may be omitted. It should be understood, of course, that the invention is not necessarily limited to the particular embodiments illustrated herein.

FIG. 3 is a front perspective view of an exemplary auxiliary cable bracket;

FIG. 4 is a back perspective view of the exemplary auxiliary cable bracket of FIG. 3;

FIG. 5 is a partial perspective view of the mounting plate of the exemplary auxiliary cable bracket of FIG. 3;

FIG. 10 is a front view of an exemplary auxiliary cable bracket installed on a ladder rack;

FIG. 11 is a cross-sectional view taken along line 11-11 in FIG. 10;

DETAILED DESCRIPTION

Referring to FIGS. 1-9, an exemplary auxiliary cable bracket 10 is shown that generally includes main plate 20, mounting plate 30, and support arm 50. In the example shown, auxiliary cable bracket 10 is made from a conductive material, such as plated steel, is approximately 7 inches high by 4.8 inches wide by 1.25 inches thick, and can be used on existing solid and hollow ladder racks, such as standard 1½ inch and 2 inch ladder racks. The dimensions of the exemplary auxiliary cable bracket 10 can also be easily adapted for use on other size ladder racks.

Figure 9:
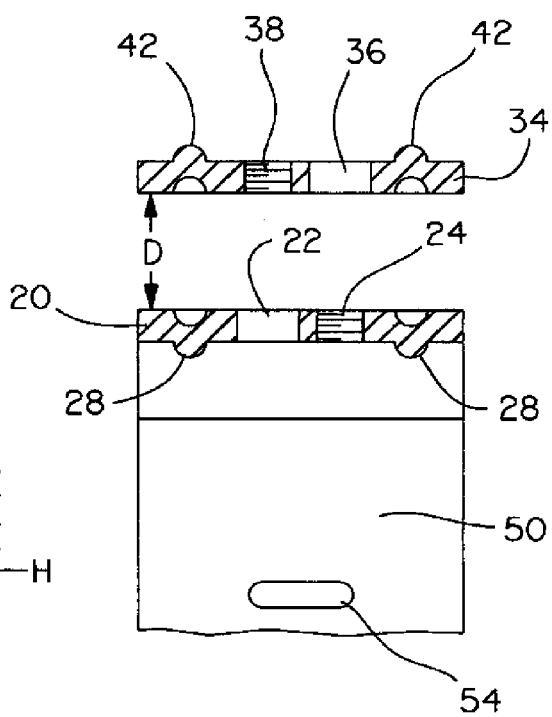
FIG. 9 is a cross-sectional view taken along line 9-9 in FIG. 3.
Figure 12:
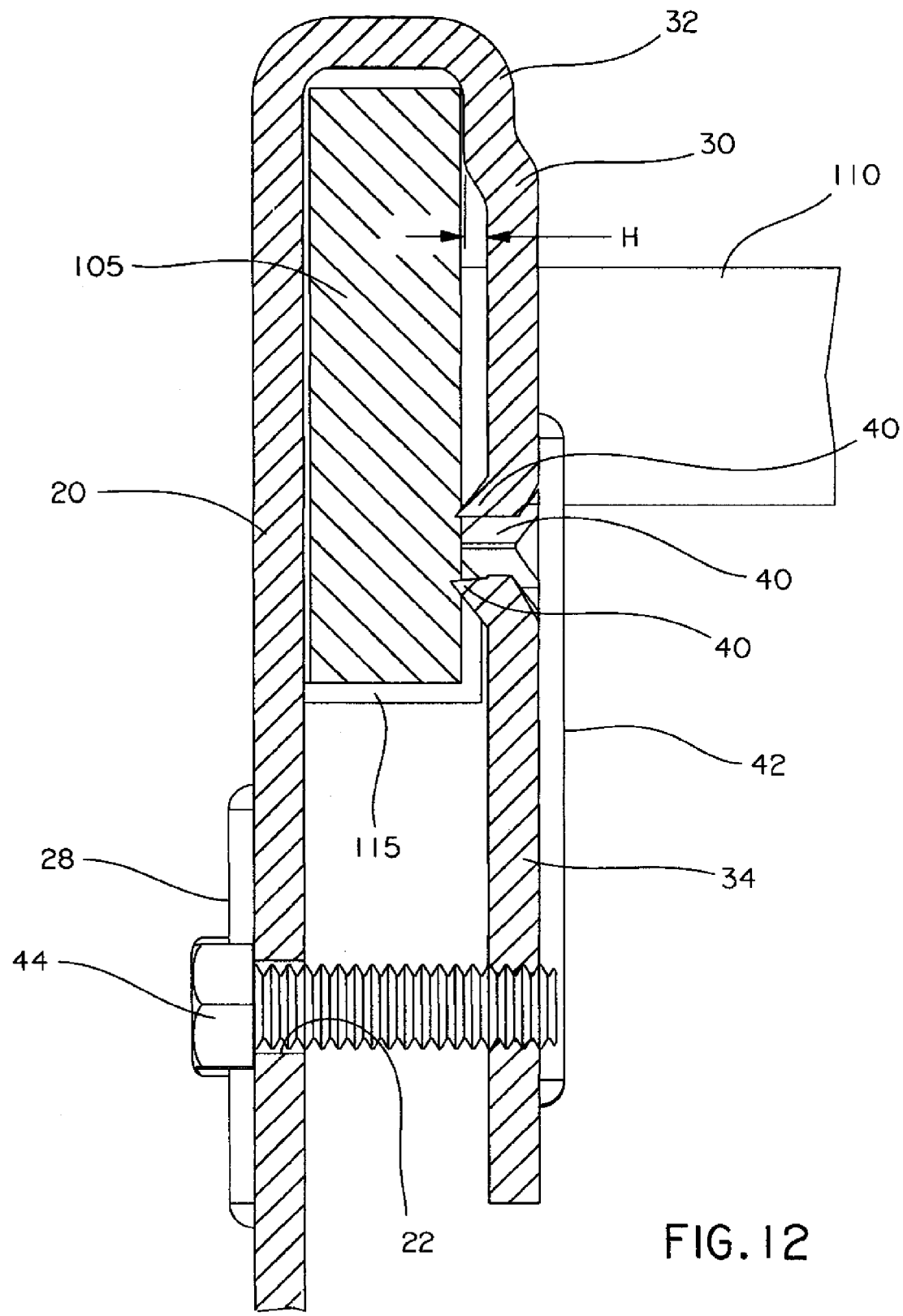
FIG. 12 is an enlarged partial view of the auxiliary cable bracket in FIG. 11.

Referring to FIGS. 3 and 9-10, main plate 20 of auxiliary cable bracket 10 has aperture 22 and threaded aperture 24, which are used to secure auxiliary cable bracket 10 to frame 105 and to provide the force required for teeth 40 on mounting plate 30 to engage frame 105. As described in more detail below, aperture 22 is generally axially aligned with threaded aperture 38 in mounting plate 30 and is configured to receive mounting screw 44 therethrough, while threaded aperture 24 is generally axially aligned with aperture 36 in mounting plate 30 and is configured such that a mounting screw 44 threads therein. Alternatively, threaded hole 24 could be a straight hole as discussed below.

Main plate 20 also has holes 26 therethrough that can be used to secure jumper cables 14 to auxiliary cable bracket 10, as described in more detail below. Depending on the method used to secure jumper cables 14, holes 26 could be straight holes or threaded holes. As discussed below, if a bolt and nut were used to secure jumper cables 14, then holes 26 could be straight holes. If a screw were used to secure jumper cables 14, then holes 26 would be threaded to receive the screws.

In the example shown, strengthening ribs 28 are also formed on main plate 20 to minimize distortion of main plate 20 when auxiliary cable bracket 10 is installed. In the example shown, main plate 20 has two strengthening ribs 28 formed on a surface of main plate 20 that runs longitudinally along main plate 20 and are placed proximate aperture 22 and threaded aperture 24. However, any number of ribs could be used and they could have different positions depending on the particular application. Alternatively, if the material used for auxiliary cable bracket 10 is strong enough, or it distortion of main plate 20 is not a concern, strengthening ribs 28 could be removed.

Referring to FIGS. 4-9 and 11-12, mounting plate 30 of auxiliary cable bracket 10 is formed of a first portion 32 and a second portion 34, which is offset from first portion 32. First portion 32 and second portion 34 of mounting plate 30 are generally parallel to main plate 30 and are spaced apart from main plate 20 such that frame 105 of ladder rack 100 can be positioned between mounting plate 30 and main plate 20. As can best be seen in FIG. 12, in this example second portion 34 is offset from first portion 32 by the height H of teeth 40. In addition, mounting plate 30 is shown as being integrally formed with main plate 20, such as by bending a metal plate into the desired shape. However, mounting plate 30 could be a separate member that is connected to main plate 20 by any well known means depending on the materials selected.

Mounting plate 30 also has aperture 36 and threaded aperture 38, which are also used to secure auxiliary cable bracket 10 to frame 105 and to provide the force required for teeth 40 to engage frame 105. Aperture 36 is generally axially aligned with threaded aperture 24 in main plate 20 and threaded aperture 38 is generally axially aligned with aperture 24 in main plate 20. Aperture 36 is configured to receive mounting screw 44 therethrough and threaded aperture 38 is configured such that a mounting screw 44 threads therein. Alternatively, as described below, threaded aperture 38 could be a straight hole and a bolt and nut could be used instead of screw 44.

Paint piercing teeth 40 are also formed on the surface of mounting plate 30 and are directed generally towards main plate 20. Alternatively, paint piercing teeth 40 could be formed on the surface of main plate 20 and be directed towards mounting plate 30 instead. In such an embodiment, main plate 20 would be formed of a first portion and a second portion, which is offset from the first portion. As can be seen, teeth 40 have pointed edges that are used to penetrate any coating, such as paint or powder coating, that may be present on frame 105, thereby creating an electrical bond between auxiliary cable bracket 10 and ladder rack 100, as described below. This provides electrical bonding between auxiliary cable bracket 10 and ladder rack 100 without having to drill holes in ladder rack 100 or having to remove paint or other coatings from ladder rack 100. Steel is punched to remove material, leaving a T-shaped opening with sharp corners. Sharp corners allow a low applied force to pierce the paint.

In the example shown, strengthening ribs 42 are also formed on mounting plate 30 to minimize distortion of mounting plate 30 when auxiliary cable bracket 10 is installed. In the example shown, mounting plate 30 has two strengthening ribs 42 formed on a surface of mounting plate 30 that runs longitudinally along mounting plate 30 and are placed proximate aperture 36 and threaded aperture 38. However, any number of ribs could be used and they could have different positions depending on the particular application. Alternatively, if the material used for auxiliary cable bracket 10 is strong enough, or if distortion of mounting plate 30 is not a concern, strengthening ribs 42 could be removed.

Referring to FIGS. 3, 4, and 11, support arm 50 of auxiliary cable bracket 10 extends from main plate 20, is generally perpendicular to main plate 20, and extends from the surface of main plate 20 that is opposite mounting plate 30. In this example, support arm 50 is integrally formed with main plate 20, such as by bending a metal plate into the desired shape. However, support arm 50 could be a separate member that is connected to main plate 20 by any well known means depending on the material selected. In this example, optional tab 52 is formed on the distal end of support arm 50 to prevent unsecured cables from sliding off of support arm 50. Slots 54 are also formed in support arm 50 and are configured to allow the passage of securing member 56, which in this example is a cable tie but could be any type of securing device. Cable tie 56 is used to secure ground cable 12 to auxiliary cable bracket 10. Slots 54 could also be formed on tab 52 or main plate 20 to provide additional positions to install cable tie 56.

Referring to FIGS. 1, 2, and 11-13, to install exemplary auxiliary cable bracket 10 on ladder rack 100, auxiliary cable bracket 10 is positioned on frame 105 of a ladder rack 100 such that main plate 20 is located on one side of frame 105, mounting plate 30 is located on the opposite side of frame 105, and teeth 40 are positioned adjacent frame 105. As can best be seen in FIG. 12, when auxiliary cable bracket 10 is positioned on frame 105, the inside surface of main plate 20 will be adjacent one surface of frame 105, the inside surface of first portion 32 of mounting plate 30 will be adjacent the opposite side of frame 105, and the inside surface of second portion 34 of mounting plate 30 will be spaced apart from the surface of frame 105 by a distance H, which is approximately the height of teeth 40.

If auxiliary cable bracket 10 is being installed with support arm 50 extending away from ladder rack 100 (e.g. FIGS. 1 and 2), mounting screw 44 is inserted through aperture 22 in main plate 20 and threaded into threaded aperture 38 in mounting plate 30. If auxiliary cable bracket 10 is being installed with support arm 50 extending underneath ladder rack 100 (e.g. FIG. 13), mounting screw 44 is inserted through aperture 36 in mounting plate 30 and threaded into threaded aperture 24 in main plate 20. Mounting screw 44 is then tightened, which will apply a force to mounting plate 30 that will cause teeth 40 to engage frame 105. By applying this force, teeth 40 will penetrate through any coating on frame 105, such as paint or powder coating, and into the base conductive material of frame 10, thereby forming an electrical bond between frame 105 and auxiliary cable bracket 10. Alternatively, threaded holes 24, 38 could be straight holes and a bolt and nut could be used to secure auxiliary cable bracket 10 to frame 105.

As discussed above, strengthening ribs 28, 42 on main plate 20 and mounting plate 30, respectively, minimize the distortion of main plate 20 and mounting plate 30 when mounting screw 44 is tightened and teeth 40 engage frame 105.

By having aperture 22 and threaded aperture 24 in main plate 20 and corresponding aperture 36 and threaded aperture 38 in mounting plate 30, auxiliary cable bracket 10 can be installed with mounting arm 50 extending away from ladder rack 100 or under ladder rack 100 with a single mounting screw 44, which is always installed facing ladder rack 100.

Therefore, an installer never has to reach under ladder rack 100 to insert or tighten mounting screw 44. This greatly simplifies the installation of auxiliary cable bracket 10 and allows auxiliary cable bracket 10 to be easily removed, relocated and reused if desired.

Once auxiliary cable bracket 10 has been installed on ladder rack 100, ground cable 12 can be positioned on support arm 50 and secured by inserting cable tie 56 through slots 54, encircling ground cable 12 with cable tie 56 and securing cable tie 56. Auxiliary cable bracket 10 can also be grounded to ground cable 12 through jumper cable 14. In this example, a two hole compression connector of jumper wire 14 is connected to auxiliary cable bracket 10 by inserting screws 16 through holes in the compression connector and threading screws 16 into holes 26 in main plate 20, which provides an engineered path from frame 105 to a telecommunications grounding bus bar (not shown). Alternatively, holes 26 could be straight holes instead of threaded holes, a bolt inserted through the holes in the compression connector and holes 26, and a nut threaded onto the bolt to secure the compression connector to the auxiliary cable bracket 10. If a bolt and nut were used, an electrical bond would have to be created between the bolt and main plate 20. This could be done in a variety of ways. For example, an internal tooth washer could be placed between the nut and main plate 20 such that the teeth penetrate into main plate 20 or a nut having teeth on a surface thereof could be used that would penetrate into main plate. Therefore, exemplary auxiliary cable bracket 10 provides support for ground cable 12, while also providing an electrical bond between auxiliary cable bracket 10 and the ladder rack 100.

Figure 1:
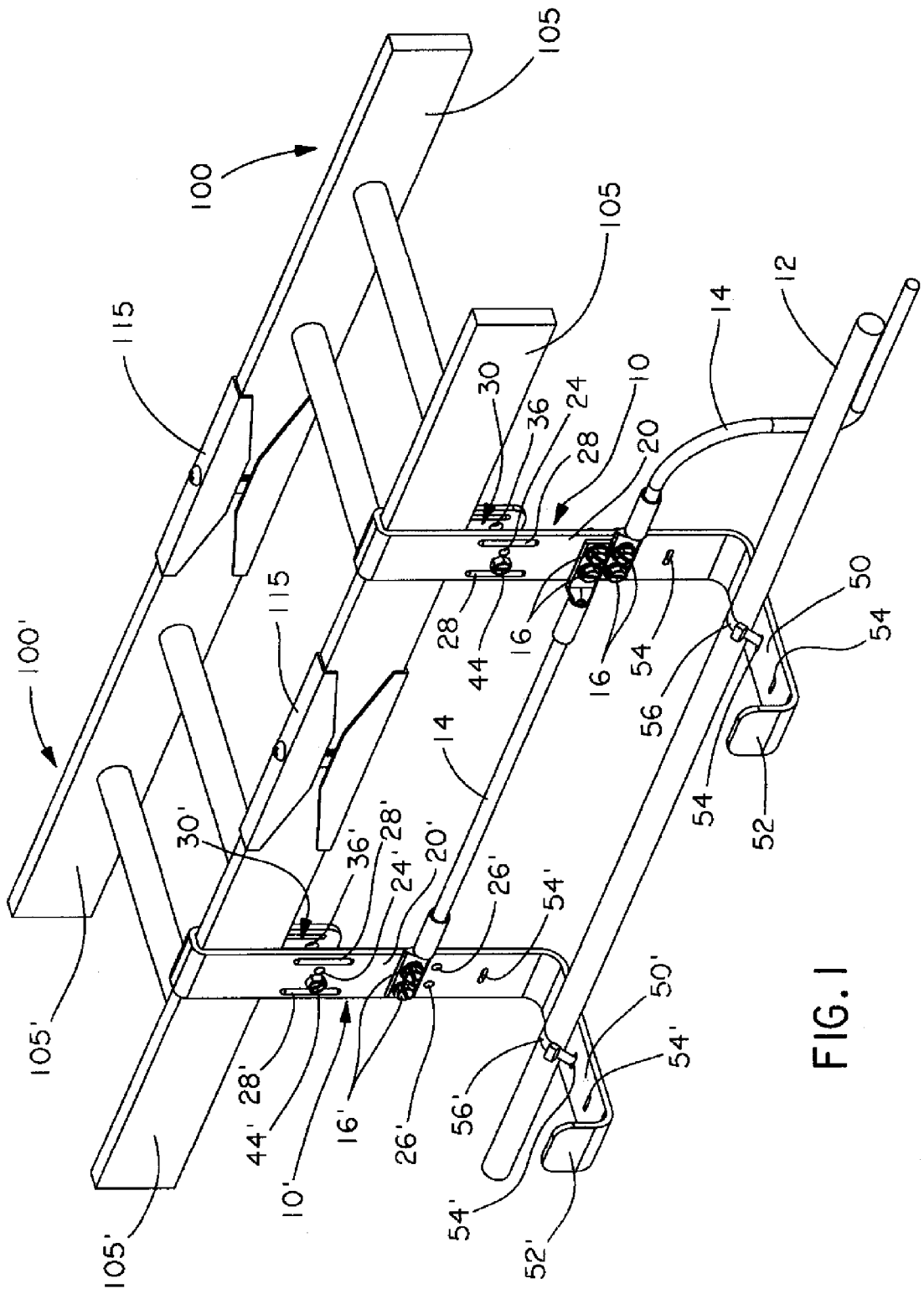
FIG. 1 is a front perspective view of exemplary auxiliary cable brackets installed on a ladder rack assembly.
Figure 2:
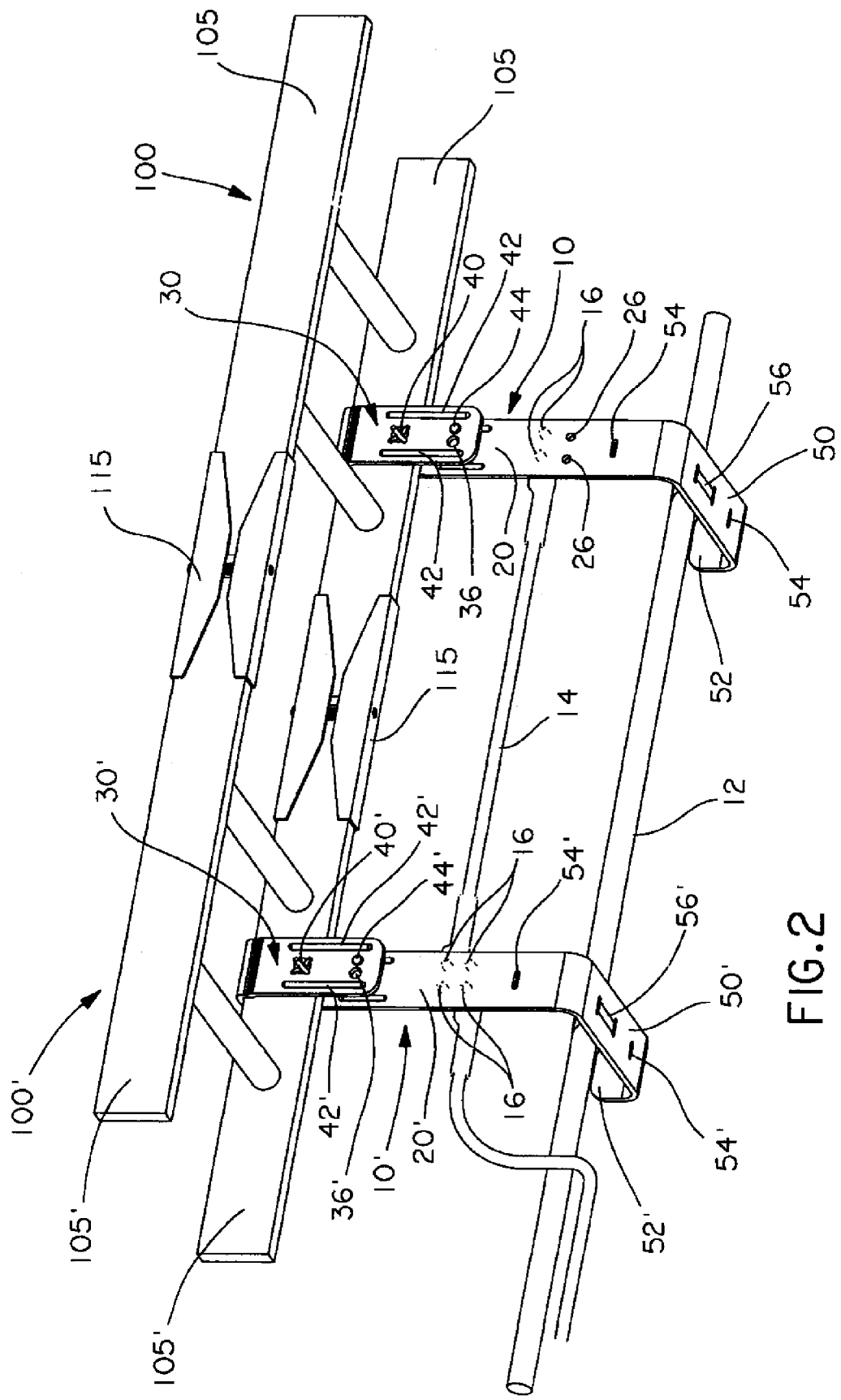
FIG. 2 is a back perspective view of the exemplary auxiliary cable brackets and ladder rack assembly of FIG. 1.
Figure 6:
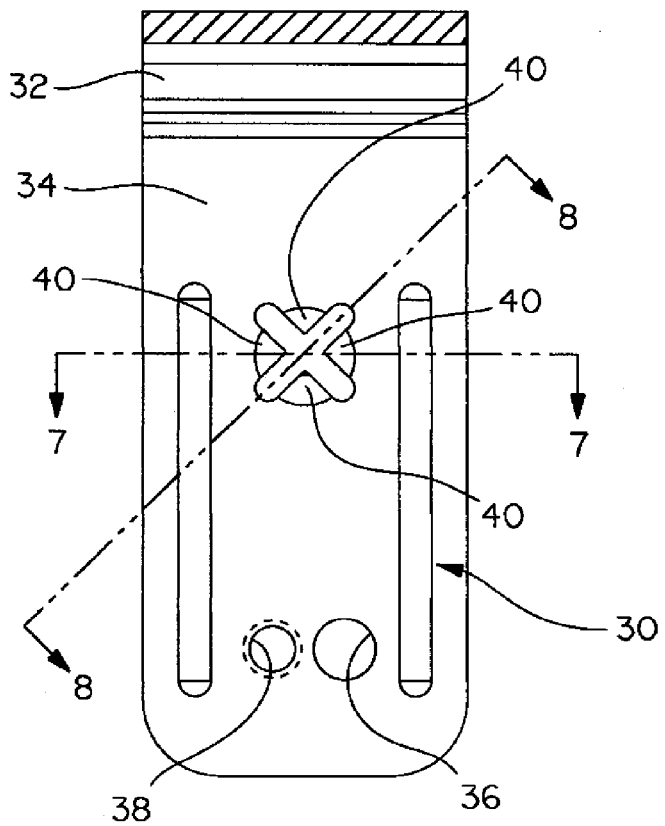
FIG. 6 is a cross-sectional view taken along line 6-6 in FIG. 3.
Figure 7:
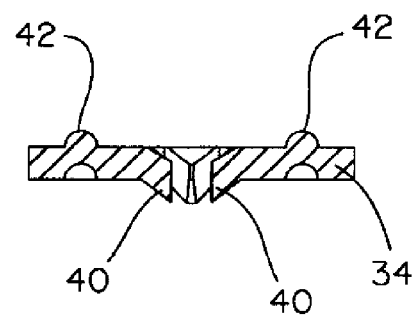
FIG. 7 is a cross-sectional view taken along line 7-7 in FIG. 6.
Figure 8:
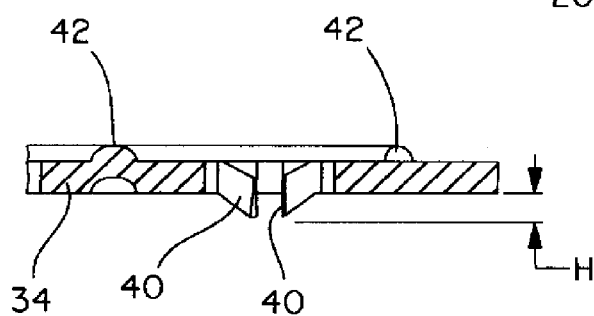
FIG. 8 is a cross-sectional view taken along line 8-8 in FIG. 6.
Figure 13:
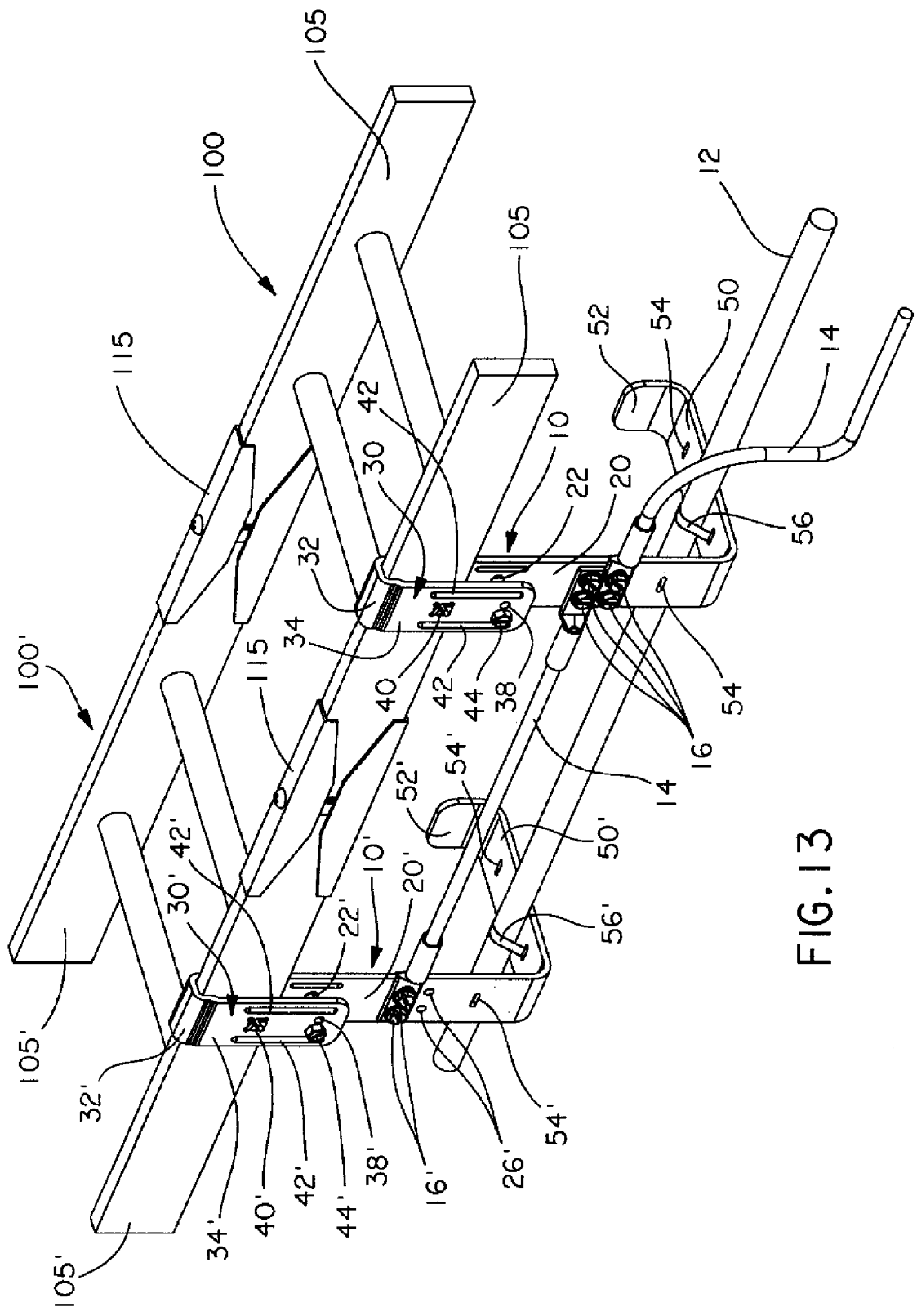
FIG. 13 is a front perspective view of exemplary auxiliary cable brackets installed on a ladder rack assembly.

As can be seen if FIGS. 1, 2, and 13, a typical ladder rack assembly has multiple ladder racks 100 and 100' that are connected by straight clamp 115. Usually straight clamp 115 does not provide grounding between ladder racks 100 and 100', however, auxiliary cable brackets 10 can be used to form an electrical bond between multiple ladder racks. To do this, a second auxiliary cable bracket 10', which is identical to auxiliary cable bracket 10, is installed on a second frame 105' of second ladder rack 100' as described above and ground cable 12 is secured to support arm 50' of second auxiliary cable bracket 10'. As described above, teeth 40' will form an electrical bond between second auxiliary cable bracket 10' and frame 105'. An electrical bond is then formed between auxiliary cable brackets 10 and 10' through jumper wire 14. As described above, two hole compression connectors of jumper wire 14 are connected to auxiliary cable brackets 10 and 10' by inserting screws 16 through holes in the compression connectors and threading screws 16 into holes 26 and 26' in main plates 20 and 20', which forms an electrical bond between auxiliary cable brackets 10 and 10'. Alternatively as mentioned above, holes 26 and 26' could be straight holes and a bolt could be inserted through the holes in the compression connector and holes 26 and 26' and a nut threaded onto the bolt to secure the compression connectors to the auxiliary cable brackets 10 and 10'.

The invention claimed is:

1. An auxiliary cable bracket, comprising:
   a main plate, the main plate comprises a first aperture and a first threaded aperture;
   a mounting plate connected to the main plate, the mounting plate positioned spaced apart from the main plate such that a frame of a ladder rack section can be positioned therebetween, the mounting plate comprises a second aperture generally aligned with the first threaded aperture in the main plate and a second threaded aperture generally aligned with the first aperture in the main plate;
   a support arm that extends generally perpendicularly from the main plate, wherein the support arm extends from the main plate in a direction away from the mounting plate; and
   at least one tooth formed on a surface of at least one of the mounting plate and the main plate.

2. The auxiliary cable bracket of claim 1, wherein the main plate and the mounting plate are integrally formed.

3. The auxiliary cable bracket of claim 1, wherein the support arm comprises a plurality of slots configured to allow the passage of a ground cable securing member therethrough.

4. The auxiliary cable bracket of claim 1, wherein the main plate comprises at least one strengthening rib.

5. The auxiliary cable bracket of claim 1, wherein the mounting plate comprises at least one strengthening rib.

6. The auxiliary cable bracket of claim 1, wherein:
   the at least one tooth is formed on a surface of the mounting plate; and
   the mounting plate comprises a first portion and a second portion, wherein
   the first portion is offset from the second portion a predetermined distance.

7. The auxiliary cable bracket of claim 6, wherein the predetermined distance is a height of the at least one tooth.

8. An auxiliary cable bracket, comprising:
   a main plate comprising a first aperture and a first threaded aperture;
   a mounting plate connected to the main plate, the mounting plate positioned spaced apart from the main plate such that a frame of a ladder rack section can be positioned therebetween, wherein the mounting plate comprises a second aperture generally aligned with the first threaded aperture in the main plate and a second threaded aperture generally aligned with the first aperture in the main plate; and
   a support arm that extends generally perpendicularly from the main plate, wherein the support arm extends from the main plate in a direction away from the mounting plate.

9. The auxiliary cable bracket of claim 8, wherein the main plate and the mounting plate are integrally formed.

10. The auxiliary cable bracket of claim 8, wherein the support arm comprises a plurality of slots configured to allow the passage of a ground cable securing member therethrough.

11. The auxiliary cable bracket of claim 8, wherein the main plate comprises at least one strengthening rib.

12. The auxiliary cable bracket of claim 8, wherein the mounting plate comprises at least one strengthening rib.

13. A method for installing an auxiliary cable bracket, comprising the steps of:
   positioning the auxiliary cable bracket onto a frame member of a ladder rack section such that a main plate and a mounting plate of the auxiliary cable bracket are positioned on opposite sides of the frame member and a tooth formed on a surface of at least one of the mounting plate and the main plate is positioned adjacent the frame member; and
   applying a force to the plate having the tooth formed thereon such that the tooth engages the frame to form an electrical bond between the frame and the auxiliary cable bracket, wherein the step of applying a force comprises the steps of:
   inserting a screw through an aperture formed in the main plate;

threading the screw through a threaded aperture formed in the mounting plate; and tightening the screw.

14. The method of claim 13, further comprising the steps of:

positioning a grounding cable on a support arm of the auxiliary cable bracket; and securing the grounding cable to the support arm of the auxiliary cable bracket.

15. The method of claim 14, further comprising the step of connecting the grounding cable to the auxiliary cable bracket such that an electrical bond is formed between the grounding cable and the auxiliary cable bracket.

16. A method for installing an auxiliary cable bracket, comprising the steps of:

positioning the auxiliary cable bracket onto a frame member of a ladder rack section such that a main plate and a mounting plate of the auxiliary cable bracket are positioned on opposite sides of the frame member and a tooth formed on a surface of at least one of the mounting plate and the main plate is positioned adjacent the frame member;

applying a force to the plate having the tooth formed thereon such that the tooth engages the frame to form an electrical bond between the frame and the auxiliary cable bracket, wherein the step of applying a force comprises the steps of:

inserting a screw through an aperture formed in the mounting plate;

threading the screw through a threaded aperture formed in the main plate; and tightening the screw.

* * * * *